United States Patent
Jeong et al.

(10) Patent No.: US 10,492,129 B2
(45) Date of Patent: *Nov. 26, 2019

(54) METHOD FOR SCANNING FOR ACCESS POINTS IN WIRELESS LAN SYSTEM

(71) Applicant: RED HAT, INC., Raleigh, NC (US)

(72) Inventors: Yang Seok Jeong, Seoul (KR); Joo Young Kim, Seoul (KR)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,247

(22) Filed: Apr. 27, 2018

(65) Prior Publication Data

US 2018/0249402 A1    Aug. 30, 2018

Related U.S. Application Data

(63) Continuation of application No. 14/411,320, filed as application No. PCT/KR2013/005732 on Jun. 27, 2013, now Pat. No. 9,986,491.

(30) Foreign Application Priority Data

Jun. 28, 2012 (KR) .......... 10-2012-0070025
May 23, 2013 (KR) .......... 10-2013-0058167

(51) Int. Cl.
*H04W 48/16* (2009.01)
*H04W 84/12* (2009.01)

(52) U.S. Cl.
CPC ............ *H04W 48/16* (2013.01); *H04W 84/12* (2013.01)

(58) Field of Classification Search
None
See application file for complete search history.

(56) References Cited

U.S. PATENT DOCUMENTS

| 5,185,081 | A | 2/1993 | Nyman et al. |
| 8,010,103 | B2 | 8/2011 | Masri et al. |
| 9,781,661 | B2 * | 10/2017 | Jeong .................... H04W 48/16 |
| 9,986,491 | B2 * | 5/2018 | Jeong .................... H04W 48/16 |
| 2006/0111103 | A1 | 5/2006 | Jeong et al. |

(Continued)

FOREIGN PATENT DOCUMENTS

| JP | 2010-124048 | 6/2010 |
| JP | 2015-511807 A | 4/2015 |

(Continued)

OTHER PUBLICATIONS

Kneckt et al., "Active Scanning related requirements for Specification Frame Work Document", IEEE 802.11-12/0207rl, Mar. 9, 2012. (6 pages total).

(Continued)

*Primary Examiner* — Mohammad S Adhami
(74) *Attorney, Agent, or Firm* — Lowenstein Sandler LLP (57) ABSTRACT

Disclosed is a method for scanning for an access point in a wireless LAN system. An active scanning method comprises the steps of: transmitting a probe request frame to an access point; and receiving, from the access point, a probe response frame corresponding to the probe request frame. The probe response frame may include time information of a beacon transmitted after the probe response frame. Thus, the efficiency of a wireless channel can be improved in a wireless LAN system.

10 Claims, 7 Drawing Sheets

(56) References Cited

U.S. PATENT DOCUMENTS

| | | | |
|---|---|---|---|
| 2007/0184835 A1 | 8/2007 | Bitran et al. | |
| 2007/0248058 A1 | 10/2007 | Fajardo et al. | |
| 2008/0198811 A1 | 8/2008 | Deshpande et al. | |
| 2008/0294759 A1 | 11/2008 | Biswas et al. | |
| 2010/0074236 A1 | 3/2010 | Takeda et al. | |
| 2010/0195595 A1 | 8/2010 | Iwata | |
| 2010/0296500 A1 | 11/2010 | Tang | |
| 2011/0199952 A1 | 8/2011 | Seok | |
| 2011/0216692 A1 | 9/2011 | Lundsgaard et al. | |
| 2013/0010664 A1 | 1/2013 | Kang et al. | |
| 2013/0250832 A1 | 9/2013 | Kim et al. | |
| 2013/0279438 A1* | 10/2013 | Kwon | H04W 72/0406 370/329 |
| 2013/0294232 A1* | 11/2013 | Segev | H04W 28/06 370/230 |
| 2013/0294270 A1* | 11/2013 | Yang | H04W 48/16 370/252 |
| 2014/0192713 A1* | 7/2014 | Park | H04B 7/2656 370/328 |
| 2018/0007618 A1* | 1/2018 | Jeong | H04W 48/16 |

FOREIGN PATENT DOCUMENTS

| | | |
|---|---|---|
| JP | 2015-521438 A | 7/2015 |
| KR | 10-2007-0102847 A | 10/2007 |
| KR | 10-2010-0072687 A | 7/2010 |
| KR | 10-2012-0041197 A | 4/2012 |
| KR | 10-2013-0085428 A | 7/2013 |
| WO | 2012-046951 A1 | 4/2012 |
| WO | 2012-077901 A1 | 6/2012 |
| WO | 2012077952 A2 | 6/2012 |
| WO | 2013147563 A1 | 10/2013 |
| WO | 2013172655 A1 | 11/2013 |

OTHER PUBLICATIONS

Segev et al., "Aggregated Probe Response", IEEE 802.11-12/0538r4, May 17, 2012, slides 1-24. (26 pages total).

"In-device interference avoidance solutions overview", 3GPP TSG-RAN WG2 Meeting #73bis Shanghai, China, Apr. 11-15, 2011, R2-111859. (9 pages total).

Lee et al., "Selective transmission of the Probe Response for 11ai Spec Framework", IEEE 802.11-12/0572rl, May 4, 2012, slides 1-22. (24 pages total).

Kwon et al., "Multiple Frequency Channel Scanning", IEEE 802.11-12/0567rl, May 4, 2012, slides 1-19. (21 pages total).

Yunoki et al., "Probe Request and Response in TGai", IEEE 11-11/1414r5, Nov. 2, 2011, slides 1-15. (17 pages total).

Abraham, Santosh, et al.; "Short Beacon", May 2012, 22 pages (document).

Lee, Jae Seung, et al.; "Active Scanning for 11ah" Jul. 2012, 15 pages (document).

* cited by examiner

METHOD FOR SCANNING FOR ACCESS POINTS IN WIRELESS LAN SYSTEM

CROSS-REFERENCE TO RELATED APPLICATIONS

This application is a continuation of U.S. patent application Ser. No. 14/411,320 filed on Dec. 24, 2014 in the U.S. Patent and Trademark Office (USPTO), which is a National Stage of International Application No. PCT/KR2013/005732 filed on Jun. 27, 2013, and claims priority to Korean Patent Application Nos. 10-2012-0070025 filed on Jun. 28, 2012 and 10-2013-0058167 filed on May 23, 2013 in the Korean Intellectual Property Office (KIPO), the entire contents of which are hereby incorporated by reference.

BACKGROUND

1. Technical Field

Example embodiments of the present invention relate in general to a method of scanning an access point and more specifically to a method of scanning an access point using an active scanning method in a wireless local area network (WLAN) system.

2. Related Art

Various wireless communication techniques are being developed along with the recent development of an information communication technology. In particular, wireless local area network (WLAN) is a technology that can provide a wireless connection to the Internet in a limited service area such as a home or office building using portable terminals, for example, a personal digital assistant (PDA), a laptop computer, and a portable multimedia player (PMP) based on a wireless frequency technology.

Standards for WLAN technology is developed and standardized by IEEE 802.11 working group (WG) in the Institute of Electrical and Electronics Engineering (IEEE) 802.11. IEEE 802.11a provides a transfer rate of 54 Mbps using 5 GHz unlicensed band. IEEE 802.11b provides a transfer rate of 11 Mbps by using direct sequence spread spectrum (DSSS) in 2.4 GHz band. IEEE 802.11g provides a transfer rate of 54 Mbps by using orthogonal frequency division multiplexing (OFDM) in 2.4 GHz band. IEEE 802.11n provides a transfer rate of 300 Mbps for two spatial streams by using multiple-input multiple-output OFDM (MIMO-OFDM). IEEE 802.11n supports a channel bandwidth of up to 40 MHz and, in this case, provides a transfer rate of 600 Mbps.

Along with the wide deployment of WLAN and the diversification of applications using WLAN, new WLAN techniques are increasingly needed to support higher throughput than IEEE 802.11n. Very high throughput (VHT) WLAN is one of IEEE 802.11 WLAN techniques, which is proposed to support a data processing rate of 1 Gbps or more. In particular, IEEE 802.11ac is developed as a standard for providing a very high throughput on the 5 GHz band, and IEEE 802.11ad is developed as a standard for providing a very high throughput on the 60 GHz band.

In a system based on the WLAN techniques, a method of scanning an access point includes an active scanning method and a passive scanning method.

In the active scanning method for the access point, a terminal (station) transmits a probe request frame to an access point, and upon receiving the probe request frame, the access point responds by transmitting a probe response frame to the terminal. Generally, the probe response frame includes much information and thus occupies a wireless channel for a long time.

In an environment in which there are a plurality of access points and a plurality of terminals, the respective probe request frames of the plurality of terminals cause a considerable number of probe response frames, which competitively occupy a wireless channels. Thus, terminals may not receive a probe response frame from a desired access point in a short time and should stay awake while receiving a probe response frame from an even undesired access point in order to receive the desired probe response frame.

In addition, since the terminal does not know a channel in which the desired access point is present, the terminal should sequentially perform the access point scan process for each channel. In this case, the terminal moves to another channel after sufficiently waiting until the terminal receives the probe response frame of the desired access point.

That is, in the active scanning method for the access point, it takes a long time to receive the probe response frame of the desired access point.

SUMMARY

Accordingly, example embodiments of the present invention are provided to substantially obviate one or more problems due to limitations and disadvantages of the related art.

Example embodiments of the present invention provide an active scanning method that is performed by a terminal using a probe response frame including only information needed to scan an access point.

Example embodiments of the present invention also provide an active scanning method that is performed by an access point using a probe response frame including only information needed to scan the access point.

In some example embodiments, a method of performing an active scan by a terminal includes transmitting a probe request frame to an access point, and receiving a probe response frame corresponding to the probe request frame from the access point, in which the probe response frame includes time information of a beacon transmitted from the access point after the probe response frame.

The method may further include receiving the beacon from the access point at a time indicated by the time information of the beacon.

The terminal may operate in a power save mode until the time indicated by the time information of the beacon after receiving the probe response frame.

The terminal may scan an access point on another channel until the time indicated by the time information of the beacon after receiving the probe response frame.

The time information may include information on an interval before the beacon is transmitted.

The time information may include information on a time at which the beacon is transmitted.

The time information may include time information of a next full beacon or time information of a next short beacon.

The probe response frame may be a short probe response frame.

In other example embodiments, a method of responding to an active scan by an access point includes receiving a probe request frame from a terminal; generating a probe response frame in response to the probe request frame; and transmitting the probe response frame to the terminal, in which the probe response frame includes time information of a beacon transmitted after the probe response frame.

The method may further include transmitting the beacon at a time indicated by the time information of the beacon.

The time information may include information on an interval before the beacon is transmitted.

The time information may include information on a time at which the beacon is transmitted.

The time information may include time information of a next full beacon or time information of a next short beacon.

The probe response frame may be a short probe response frame.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Since the present invention may be variously modified and have several exemplary embodiments, specific exemplary embodiments will be shown in the accompanying drawings and be described in detail in a detailed description.

However, it should be understood that the particular embodiments are not intended to limit the present disclosure to specific forms, but rather the present disclosure is meant to cover all modification, similarities, and alternatives which are included in the spirit and scope of the present disclosure.

It will be understood that, although the terms first, second, etc. may be used herein to describe various elements, these elements should not be limited by these terms. These terms are only used to distinguish one element from another. For example, a first component may be designated as a second component, and similarly, the second component may be designated as the second component. The use of the term of 'and/or' means that combination of a plurality of related and described items or one items among a plurality of related and described items is included.

When it is mentioned that a certain component is "coupled with" or "connected with" another component, it may be understood that another component can exist between the two components although the component can be directly coupled or connected with the another component. Meanwhile, when it is mentioned that a certain component is "directly coupled with" or "directly connected with" another component, it has to be understood that another component does not exist between the two components.

In the following description, the technical terms are used only for explaining a specific exemplary embodiment while not limiting the present disclosure. Singular forms used herein are intended to include plural forms unless explicitly indicated otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or a combination thereof.

Unless otherwise defined, all terms (including technical and scientific terms) used herein have the same meaning as commonly understood by one of ordinary skill in the art to which this invention belongs. Terms such as terms that are generally used and have been in dictionaries should be construed as having meanings matched with contextual meanings in the art. In this description, unless defined clearly, terms are not ideally, excessively construed as formal meanings.

Hereinafter, exemplary embodiments of the present invention will be described in detail with reference to the accompanying drawings. In describing the invention, in order to facilitate the entire understanding of the invention, like numbers refer to like elements throughout the description of the figures and the repetitive description thereof will be omitted.

Throughout this specification, a station (hereinafter also referred to as an STA) is any functional medium including a medium access control (MAC) and wireless-medium physical layer (PHY) interface conforming to the IEEE 802.11 standard. The STA may include an access point (AP) STA and a non-AP STA. The AP STA may be simply referred to as an access point (hereinafter also referred to as an AP), and the non-AP STA is simply referred to as a terminal.

The STA includes a processor and a transceiver, and may further include a user interface, a display device, and so on. The processor is a functional unit devised to generate a frame to be transmitted through a wireless network or to process a frame received through the wireless network, and performs various functions to control the STA. The transceiver is functionally connected to the processor and is a functional unit devised to transmit and receive a frame for the STA through the wireless network.

The AP may be called a convergence controller, a base station (BS), a node-B, an eNode-B, a base transceiver system, or a site controller, and may include some or all of functions thereof.

The terminal may be called a wireless transmit/receive unit (WTRU), a user equipment (UE), a user terminal (UT), an access terminal (AT), a mobile station (MS), a mobile terminal, a subscriber unit, a subscriber station (SS), a wireless device, or the like, and may include some or all of functions thereof.

Here, the terminal may include a communication enabled desktop computer, laptop computer, tablet PC, wireless phone, mobile phone, smartphone, e-book reader, portable multimedia player (PMP), portable gaming console, navigation device, digital camera, digital multimedia broadcasting (DMB) player, digital audio recorder, digital audio player, digital picture recorder, digital picture player, digital video recorder, digital video player, etc.

Figure 1:
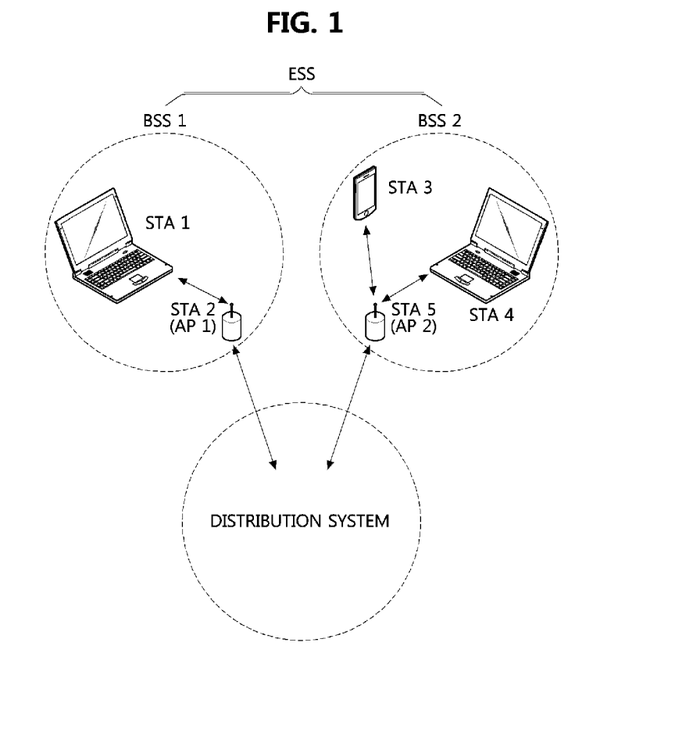
FIG. 1 is a conceptual view showing a configuration of an IEEE 802.11 WLAN system according to an embodiment of the present invention.

FIG. 1 is a conceptual view showing a configuration of an IEEE 802.11 WLAN system according to an embodiment of the present invention.

Referring to FIG. 1, the IEEE 802.11 WLAN system includes at least one basic service set (BSS). The BBS denotes a set of stations STA 1, STA 2 (AP 1), STA 3, STA 4, STA 5 (AP 2) that may be successfully synchronized to communicate with one another, but does not denote a certain region.

The BBS may be classified into an infrastructure BSS and an independent BSS (IBSS). BBS 1 and BBS 2 denote the infrastructure BSS. BBS 1 may include a terminal STA 1, an access point STA 2 (AP 1) that provides a distribution service, and a distribution system (DS) that connects a plurality of access points STA 2 (AP 1) and STA 5 (AP 2). In BSS 1, the access point STA 2 (AP 1) manages the terminal STA 1.

BBS 2 may include the terminals STA 3 and STA 4, the access point STA 5 (AP 2) that provides a distribution service, and a distribution system that connects the plurality of access points STA 2 (AP 1) and STA 5 (AP 2). In BSS 2, the access point STA 5 (AP 2) manages the terminals STA 3 and STA 4.

The independent BSS (IBSS) is a BSS that operates in an ad-hoc mode. Since the IBSS does not include an access point, there is no centralized management entity for performing a central management function. That is, in the IBSS, terminals are managed in a distributed manner. The IBSS is a self-contained network, in which all terminals may be mobile terminals and may be disallowed to access the distribution system (DS).

The access points STA 2 (AP 1) and STA 5 (AP 2) provide a connection to the DS through a wireless medium for the associated terminals STA 1, STA 3 and STA 4. In BSS 1 or BSS 2, generally, a communication between the terminals STA 1, STA 3, and STA 4 is made through the access points STA 2 (AP 1) and STA 5 (AP 2). However, when a direct link is established, a direct communication between the terminals STA 1, STA 3, and STA 4 is enabled.

A plurality of infrastructure BBSs may be interconnected through the DS. The plurality of BBSs connected to each other through the DS is called an extended service set (ESS). STAs included in the ESS may communicate with each other, and within the same ESS, a terminal may move from one BSS to another BSS while communicating in a seamless manner.

The DS is a mechanism in which one AP communicates with another AP. By using the DS, an AP may transmit a frame to terminals that is associated with a BSS managed by the AP, or transmit a frame to a terminal that has moved to another BSS. In addition, the AP may transmit and receive a frame to and from an external network such as a wired network. The DS is not necessarily a network and has no limitation in its form as long as a predetermined distribution service specified in the IEEE 802.11 standard can be provided. For example, the DS may be a wireless network such as a mesh network, or may be a physical structure for interconnecting APs.

An AP scanning method according to an embodiment of the present invention, which will be described below, may be applied to the above IEEE 802.11 WLAN system and also various networks such as a wireless personal area network (WPAN), a wireless body area network (WBAN), and so on.

Figure 2:
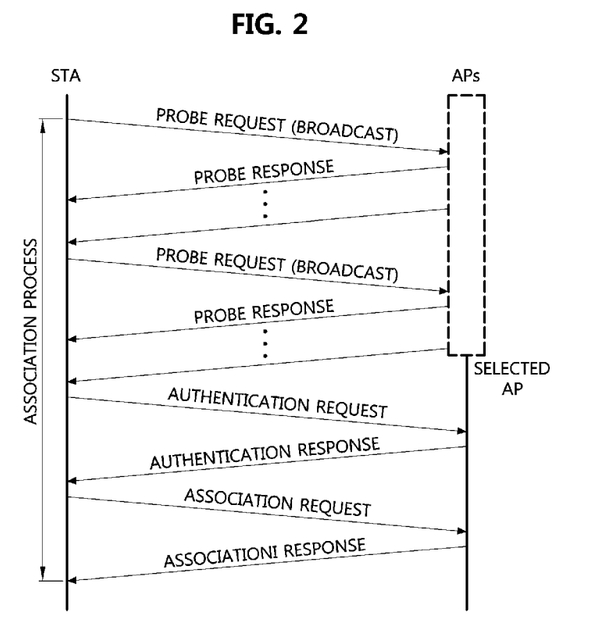
FIG. 2 is a conceptual view showing an association process for a terminal in an infrastructure BSS.

FIG. 2 is a conceptual view showing an association process for a terminal in an infrastructure BSS.

In order for a terminal STA to transmit and receive data in an infrastructure BSS, first, the terminal STA should be associated with an AP.

Referring to FIG. 2, the association process of the terminal STA in the infrastructure BSS may include: 1) probe step of probing an AP, 2) authentication step of authenticating the probed AP, and 3) association step of associating with the authenticated AP.

First, the terminal STA may probe neighboring APs through the probe process. The probe process includes a passive scanning method and an active scanning method. The passive scanning method may be performed by overhearing beacons that are transmitted by the neighboring APs. On the other hand, the active scanning method may be performed by broadcasting a probe request frame. Upon receiving the probe request frame, the AP may transmit a probe response frame corresponding to the probe request frame to the terminal STA. The terminal STA may check the presence of the neighboring APs by receiving the probe response frame.

Subsequently, the terminal STA performs authentication with the probed APs, and may perform the authentication with the plurality of APs. An authentication algorithm conforming to the IEEE 802.11 standard includes an open system algorithm that exchanges two authentication frames and a shared key algorithm that exchanges four authentication frames. Through a process of exchanging the authentication request frame and the authentication response frame based on the authentication algorithm, the terminal STA may perform authentication with the AP.

Last, the terminal STA selects one AP from among the authenticated plurality of APs and performs an association process with the selected AP. That is, the terminal STA transmits an association request frame to the selected AP. Upon receiving the association request frame, the AP transmits the terminal STA to an association response frame corresponding to the association request frame. As such, through the process of exchanging the association request frame and the association response frame, the terminal STA may perform the association process with the AP.

Figure 3:
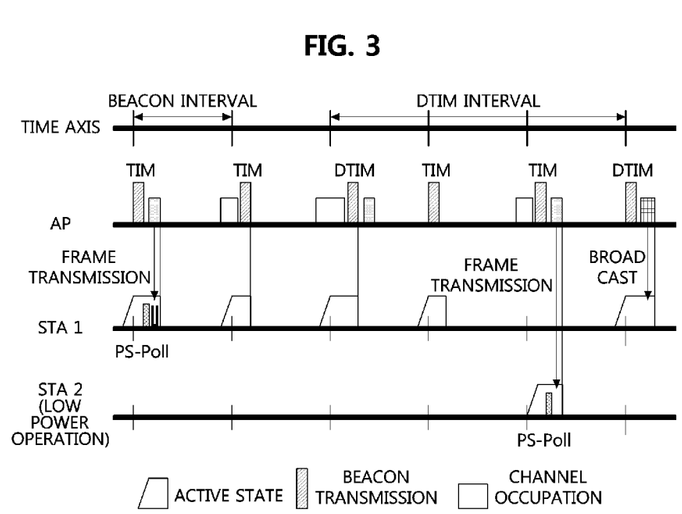
FIG. 3 is a conceptual view showing a data transmission process of an access point according to an embodiment of the present invention.

FIG. 3 is a conceptual view showing a data transmission process of an access point according to an embodiment of the present invention.

Referring to FIG. 3, the AP broadcasts a beacon periodically and may broadcast a beacon including a delivery traffic indication message (DTIM) at every 3 beacon intervals. The terminals STA 1 are STA 2 periodically wake up from a power save mode (PSM) and receives the beacon, and check a traffic indication map (TIM) or DTIM included in the beacon to determine whether the data to be transmitted to the terminals is buffered in the AP. In this case, when there is the buffered data, the terminals STA 1 and STA 2 maintain awake and receive the data from the AP. When there is no buffered data, the terminals STA 1 and STA 2 return to the PSM (that is, a doze state).

That is, when a bit in the TIM corresponding to an AID of the terminal STA 1 or STA 2 is set as 1, the terminal STA 1 or STA 2 transmits, to the AP, a power save (PS)-Poll frame (or a trigger frame) that informs the AP that the terminal STA is awake and ready to receive data. The AP may determine that the terminal STA 1 or STA 2 is ready to receive the data by receiving the PS-Poll frame and then may transmit the data or an acknowledgement (ACK) to the terminal STA 1 or STA 2. When the AP transmits the ACK to the terminal STA 1 or STA 2, the AP transmits data to the terminal STA 1 or STA 2 at an appropriate time. On the other hand, when the bit in the TIM corresponding to the AID of the terminal STA 1 or STA 2 is set as 0, the terminal STA 1 or STA 2 returns to the PSM.

Figure 4:
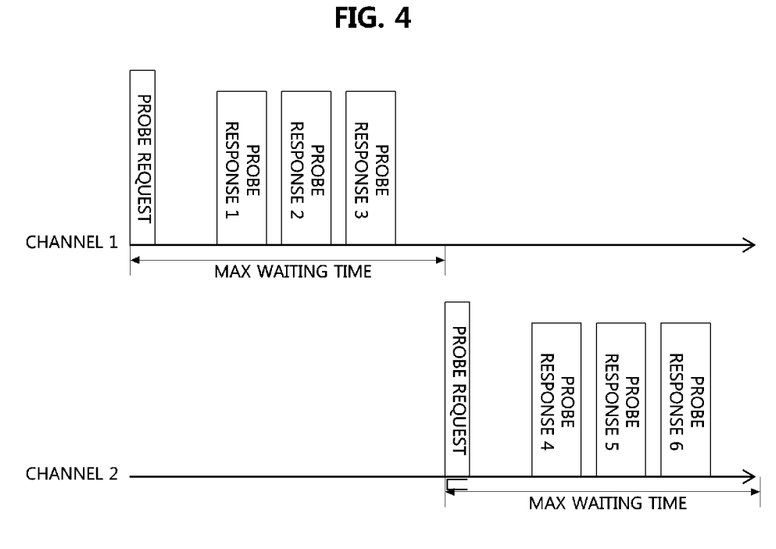
FIG. 4 is a conceptual view showing an active scanning method in multiple channels.

FIG. 4 is a conceptual view showing an active scanning method in multiple channels.

Referring to FIG. 4, first, the terminal may transmit a probe request frame to a specific access point or all access points on channel 1 and may receive a probe response frame that is transmitted from the one or more access points during a max waiting time. That is, during the max waiting time on channel 1, the terminal may receive probe response frame 1 from access point 1, receive probe response frame 2 from access point 2, and receive probe response frame 3 from access point 3.

After the max waiting time on channel 1, the terminal may move to channel 2 and transmit a probe request frame to a specific access point or all access points and may receive a probe response frame that is transmitted from the one or more access points during a max waiting time. That is, during the max waiting time on channel 2, the terminal may receive probe response frame 4 from access point 4, receive probe response frame 5 from access point 5, and receive probe response frame 6 from access point 6.

Figure 5:
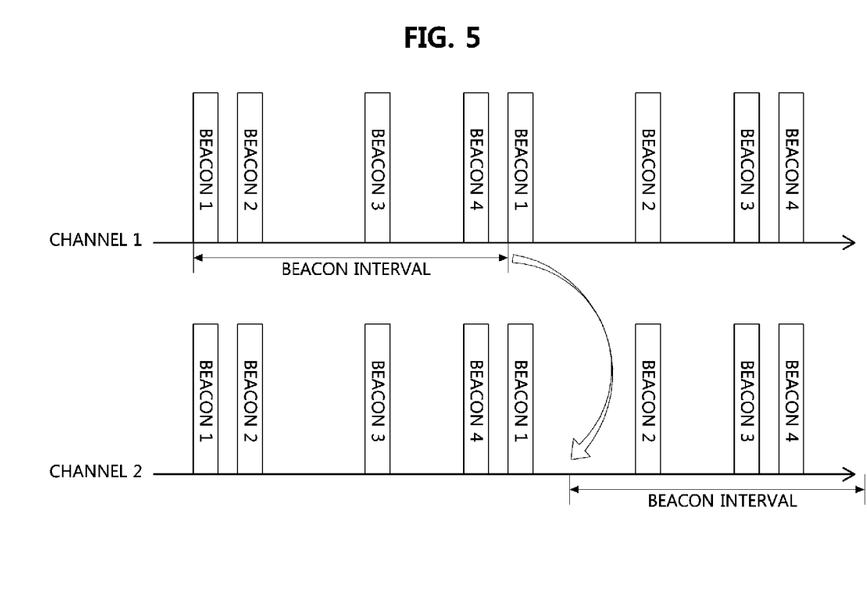
FIG. 5 is a conceptual view showing a passive scanning method in multiple channels.

FIG. 5 is a conceptual view showing a passive scanning method in multiple channels.

Referring to FIG. 5, first, the terminal may receive beacons transmitted from the access point on channel 1 and may move to channel 2 after a beacon interval on channel 1. Subsequently, the terminal may receive beacons transmitted from the access point on channel 2.

Figure 6:
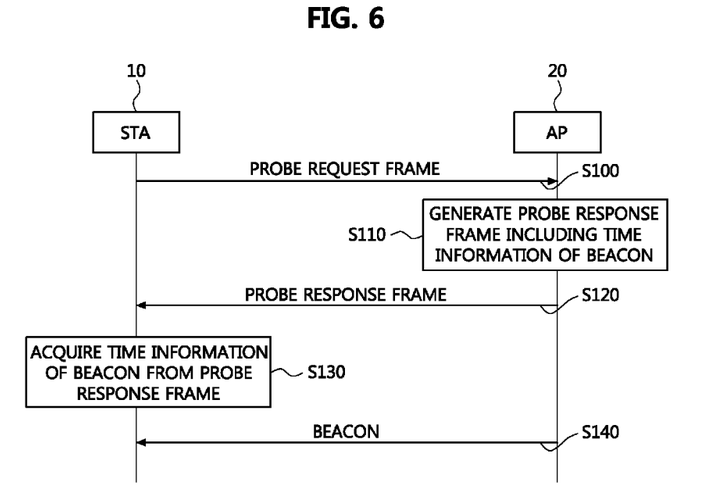
FIG. 6 is a flowchart showing an active scanning method according to an embodiment of the present invention.

FIG. 6 is a flowchart showing an active scanning method according to an embodiment of the present invention.

Referring to FIG. 6, first, a terminal 10 may transmit a probe request frame to an access point 20 (S100). Here, the terminal 10 may transmit a probe request frame to a specific access point or transmit a probe request frame to unspecific access points (that is, all access points). The terminal 10 may make a request to provide time information of a next beacon through the probe request frame. That is, the terminal 10 may set any field that indicates a request to provide the time information of the next beacon and may generate a probe request frame including the field to transmit the probe request frame to an access point.

When the probe request frame is received from the terminal 10, the access point 20 may generate a probe response frame including the time information of the next beacon (S110). That is, the access point 20 may transmit the probe response frame including the time information of the beacon transmitted after transmission of the probe response frame. The access point 20 may generate a probe response frame including time information of a next full beacon or time information of the next short beacon (that is, an auxiliary beacon).

Here, the full beacon denotes a beacon that is generally used in the wireless local area network (WLAN) (IEEE 802.11). The short beacon is used to speed up the passive scan, has a period shorter than the full beacon, and denotes a beacon including only essential information for the scan.

For example, the short beacon may include timestamp information, change sequence information, next full beacon time information, compressed service set identifier (SSID) information, access network option information, and the like.

The time information of the next beacon may denote an interval before the next beacon is transmitted or a time at which the next beacon is transmitted (that is, a target beacon transmission time (TBTT)).

That is, the access point 20 may generate a new probe response frame (that is, a short probe response frame or probe ACK frame) instead of an existing probe response frame. The new probe response frame may be smaller than the existing probe response frame, and the new probe response frame may include the SSID and the next beacon time information (that is, the time information of a beacon transmitted after the probe response frame is transmitted) as essential information for the scan.

The access point 20 may transmit the probe response information including the time information of the beacon to the terminal 10 (S120).

Upon receiving the probe response frame from the access point 20, the terminal 10 may acquire the time information (that is, the time information of the beacon transmitted after the probe response frame is transmitted) of the next beacon from the probe response frame (S130). When the time information of the next beacon indicates an interval before the next beacon is transmitted, the terminal 10 may acquire a time at which the next beacon is transmitted based on the current time and the interval before the next beacon is transmitted.

When the time at which the next beacon is transmitted is acquired, the terminal 10 may return to a sleep state (that is, a power save mode) by the time at which the next beacon is transmitted or may perform the above-described active scan in another channel.

The access point 20 may transmit a beacon at a time indicated by the time information of the next beacon that is included in the probe response frame (S140). Here, the access point 20 may transmit a full beacon or short beacon. The terminal 10 may receive the beacon at a time indicated by the time information of the next beacon that is included in the probe response frame.

Figure 7:
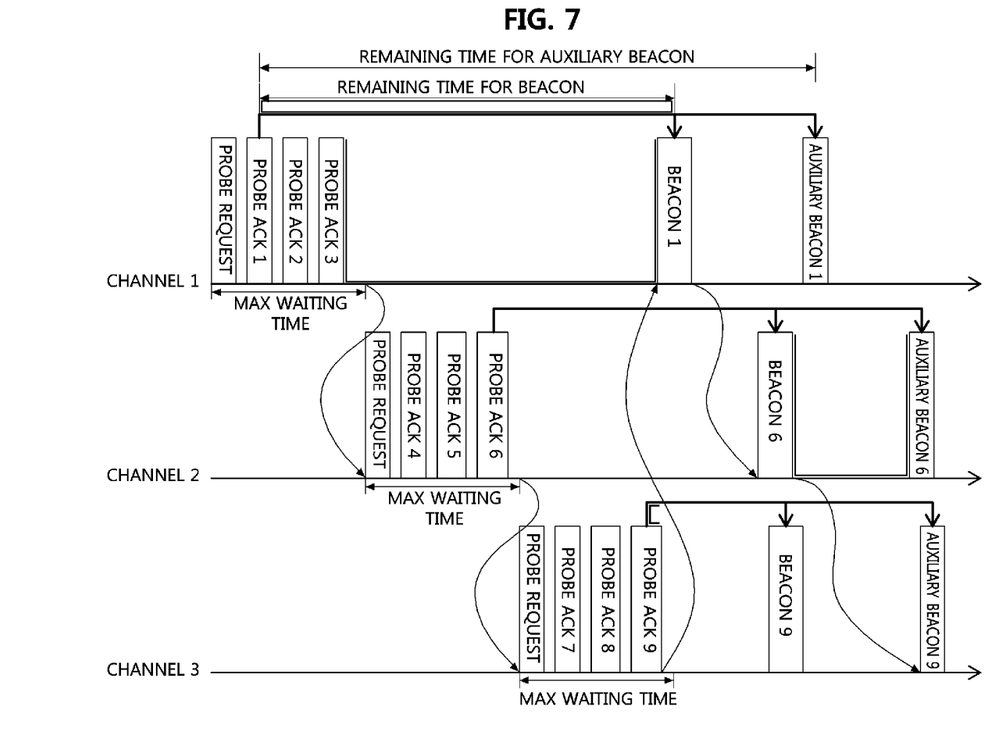
FIG. 7 is a conceptual view showing an active scanning method according to an embodiment of the present invention.

FIG. 7 is a conceptual view showing an active scanning method according to an embodiment of the present invention.

Referring to FIG. 7, first, the terminal may transmit a probe request frame on channel 1 and may receive a response thereto during a max waiting time. That is, during the max waiting time on channel 1, the terminal may receive probe response frame 1 (that is, probe ACK 1) from access point 1, receive probe response frame 2 (that is, probe ACK 2) from access point 2, and receive probe response frame 3 (that is, probe ACK 3) from access point 3.

Here, probe response frames 1 to 3 denote the probe response frame including the time information of the next beacon that is shown in FIG. 6. That is, since probe response frames 1 to 3 are smaller than the existing probe response frame, the max waiting time on channel 1 may be set shorter than the existing max waiting time.

Upon receiving the probe response frame transmitted during the max waiting time on channel 1, the terminal may determine an association target access point based on signal strength of the probe response frame. That is, the terminal may determine, as the association target access point, an access point that transmits a probe response frame having highest signal strength among probe response frames 1 to 3 or may determine, as the association target access point, an access point that transmits a probe response frame satisfying a predetermined reference among probe response frames 1 to 3.

For example, when probe response frame 1 has the highest signal strength, the terminal may determine access point 1 as the association target access point and may acquire a transmission time of next beacon 1 or next auxiliary beacon 1 (that is, short beacon 1) based on the time information of the next beacon included in probe response frame 1. Here, the terminal may determine to receive a beacon at a transmission time of next beacon 1.

When plenty of time remains before the transmission time of next beacon 1 (that is, a time for scanning an access point in another channel), the terminal may scan an access point in another channel. That is, the terminal may move to channel 2 and transmit the probe request frame. During the max waiting time on channel 2, the terminal may receive probe response frame 4 (that is, probe ACK 4) from access point 4, receive probe response frame 5 (that is, probe ACK 5) from access point 5, and receive probe response frame 6 (that is, probe ACK 6) from access point 6.

Here, probe response frames 4 to 6 denote the probe response frame including the time information of the next beacon that is shown in FIG. 6. That is, since probe response frames 4 to 6 are smaller than the existing probe response frame, the max waiting time on channel 2 may be set shorter than the existing max waiting time.

Upon receiving the probe response frame transmitted during the max waiting time on channel 2, the terminal may determine an association target access point based on signal strength of the probe response frame. For example, when probe response frame 4 has the highest signal strength among probe response frames 4 to 6, the terminal may determine access point 6 as the association target access point and may acquire a transmission time of next beacon 6 or next auxiliary beacon 6 based on the time information of the next beacon included in probe response frame 6. Here, the terminal may determine to receive a beacon at a transmission time of next beacon 6.

When plenty of time remains before the transmission time of next beacon 1 (that is, a time for scanning an access point in another channel), the terminal may scan an access point in another channel. That is, the terminal may move to channel 3 and transmit the probe request frame. During the max waiting time on channel 3, the terminal may receive probe response frame 7 (that is, probe ACK 7) from access point 7, receive probe response frame 8 (that is, probe ACK 8) from access point 8, and receive probe response frame 9 (that is, probe ACK 9) from access point 9.

Here, probe response frames 7 to 9 denote the probe response frame including the time information of the next beacon that is shown in FIG. 6. That is, since probe response frames 7 to 9 are smaller than the existing probe response frame, the max waiting time on channel 3 may be set shorter than the existing max waiting time.

Upon receiving the probe response frame transmitted during the max waiting time on channel 3, the terminal may determine an association target access point based on signal strength of the probe response frame. For example, when probe response frame 9 has the highest signal strength among probe response frames 7 to 9, the terminal may determine access point 9 as the association target access point and may acquire a transmission time of next beacon 9 or next auxiliary beacon 9 based on the time information of the next beacon included in probe response frame 9. Here, when a transmission time of beacon 6 temporarily overlaps a transmission time of beacon 9, the terminal may determine to receive an auxiliary beacon at a transmission time of auxiliary beacon 9 that has a lower priority than beacon 9.

When plenty of time does not remain before the transmission time of next beacon 1 (that is, a time for scanning an access point on another channel), the terminal may move to channel 1 to receive beacon 1 at a transmission time of beacon 1, move to channel 2 to receive beacon 6 at a transmission time of beacon 6, and then move to channel 3 to receive auxiliary beacon 9 at a transmission time of auxiliary beacon 9.

According to an embodiment of the present invention, a time during which a wireless channel is occupied by the probe response frame may be reduced by using a probe response frame (that is, a short probe response frame or probe ACK) including information needed to scan an access point, thus enhancing efficiency of a wireless channel.

In addition, the terminal may be aware of a transmission time of a beacon through time information of a next beacon included in the probe response frame and scan an access point on another channel until the next beacon is transmitted based on the transmission time, thus reducing time consumed in scanning the access point.

While the example embodiments of the present invention and their advantages have been described in detail, it should be understood that various changes, substitutions and alterations may be made herein without departing from the scope of the invention.

What is claimed is:

1. A method of performing an active scan by a terminal, the method comprising:

transmitting, to an access point, a probe request frame indicating a requested type of a probe response frame, wherein the probe request frame requests a first type probe response frame when the probe request frame is a first type probe request frame, wherein the probe request frame requests a second type probe response frame when the probe request frame is a second type probe request frame; and receiving, from the access point, the probe response frame based on the probe request frame, wherein the first type probe response frame including information on a next beacon transmission time is received in response to the first type probe request frame, wherein the second type probe response frame is received in response to the second type probe request frame, wherein the first type probe response frame has shorter length than a second type probe response frame, and wherein a beacon is received from the access point at a time determined by the information on the next beacon transmission time when the terminal receives the first type probe response frame.

2. The method of claim 1, wherein the terminal operates in a power save mode until the time determined by the information on the next beacon transmission time after receiving the first type probe response frame.

3. The method of claim 1, wherein the terminal scans an access point on another channel until the time determined by the information on the next beacon transmission time after receiving the first type probe response frame.

4. The method of claim 1, wherein the information on the next beacon transmission time includes information on a transmission time of the beacon from the access point or information on a transmission time of an auxiliary beacon, wherein the auxiliary beacon has shorter transmission period than the beacon, and includes lesser information than the beacon.

5. The method of claim 1, wherein the first type probe response frame further includes Service Set Identifier (SSID) of the access point.

6. A method of responding to an active scan by an access point, the method comprising:

receiving, from a terminal, a probe request frame indicating a requested type of a probe response frame, wherein the probe request frame requests a first type probe response frame when the probe request frame is a first type probe request frame, wherein the probe request frame requests a second type probe response frame when the probe request frame is a second type probe request frame; and transmitting, to the terminal, the probe response frame based on the probe request frame,
wherein the first type probe response frame including information on a next beacon transmission time is received in response to the first type probe request frame,
wherein the second type probe response frame is received in response to the second type probe request frame,
wherein the first type probe response frame has shorter length than a second type probe response frame, and
wherein a beacon is received from the access point at a time determined by the information on the next beacon transmission time when the terminal receives the first type probe response frame.

7. The method of claim 6, wherein the information on the next beacon transmission time includes information on a transmission time of the beacon from the access point or information on a transmission time of an auxiliary beacon, wherein the auxiliary beacon has shorter transmission period than the beacon, and includes lesser information than the beacon.

8. The method of claim 6, wherein the first type probe response frame further includes Service Set Identifier (SSID) of the access point.

9. A terminal performing an active scan, the terminal comprising:
   a transceiver; and
   a processor, wherein the processor is configured to:
   transmit, to an access point, using the transceiver, a probe request frame indicating a requested type of a probe response frame,
   wherein the probe request frame requests a first type probe response frame when the probe request frame is a first type probe request frame,
   wherein the probe request frame requests a second type probe response frame when the probe request frame is a second type probe request frame; and
   receive, from the access point, using the transceiver, the probe response frame based on the probe request frame,
   wherein the first type probe response frame including information on a next beacon transmission time is received in response to the first type probe request frame,
   wherein the second type probe response frame is received in response to the second type probe request frame,
   wherein the first type probe response frame has shorter length than a second type probe response frame, and
   wherein a beacon is received from the access point at a time determined by the information on the next beacon transmission time when the terminal receives the first type probe response frame.

10. An access point for responding to an active scan, the access point comprising:
    a transceiver; and
    a processor, wherein the processor is configured to:
    receive, from a terminal, using the transceiver, a probe request frame indicating a requested type of a probe response frame, wherein the probe request frame requests a first type probe response frame when the probe request frame is a first type probe request frame,
    wherein the probe request frame requests a second type probe response frame when the probe request frame is a second type probe request frame; and
    transmit, to the terminal, using the transceiver, the probe response frame based on the probe request frame,
    wherein the first type probe response frame including information on a next beacon transmission time is received in response to the first type probe request frame,
    wherein the second type probe response frame is received in response to the second type probe request frame,
    wherein the first type probe response frame has shorter length than a second type probe response frame, and
    wherein a beacon is received from the access point at a time determined by the information on the next beacon transmission time when the terminal receives the first type probe response frame.

* * * * *